United States Patent Office 3,343,779
Patented Sept. 26, 1967

3,343,779
REAR VIEW MIRROR
Theodore L. Beach, Jr., P.O. Box 366,
Donnelsville, Ohio 45319
Filed Aug. 19, 1963, Ser. No. 303,087
7 Claims. (Cl. 248—488)

The present invention relates to a novel rear view mirror and more particularly to rear view mirrors adapted to be adjustably mounted as miror heads on vehicles such as trucks and the like.

Generally, there is provided a rear view mirror to be mounted upon brackets which hold it in spaced relation to the adjacent outer side of a vehicle upon which it is mounted and the body of the mirror is such that it aerodynamically presents a minimum of wind resistance. The device itself consists of the body of sheet material having integrally formed opposing grooved portions for receiving the glass mirror and the body is biased in such manner that the grooved portions are normally sprung away from each other. A pair of end pieces is adapted to encompass the end portions of the body when the same are forced inwardly toward each other so that, in assembled form, there is provided a composite mirror head having unique characteristics more fully described hereinafter. A shaft extends longitudinally through the end pieces and body and is provided at each of its ends inwardly of the adjacent end piece with a pair of tension arms which bear against the body of the device holding the latter in snug engagement with the end pieces. The assembled device is substantially "tear-drop" shape to afford a minimum of air resistance when the vehicle upon which it is mounted is in moton.

It is accordingly an object of the invention to provide a mirror of the character set forth which is simple in construction, inexpensive to manufacture and yet effective and efficient in use.

Another object of the invention is to provide a mirror of the character set forth which presents a minimum of air resistance while the vehicle upon which it is mounted is in motion.

Another object of the invention is to provide a mirror of the character set forth having a novel means for preventing rattling of the component parts thereof.

Still another object of the invention is to provide, in a device of the character set forth, novel mounting means for a glass mirror therein.

A further object of the invention is to provide, in a device of the character set forth, novel tensioning arms forming a part of the invention.

Other and further objects of the invention will become apparent from a reading of the following specification taken in conjunction with the drawings, in which.

Figure 1:
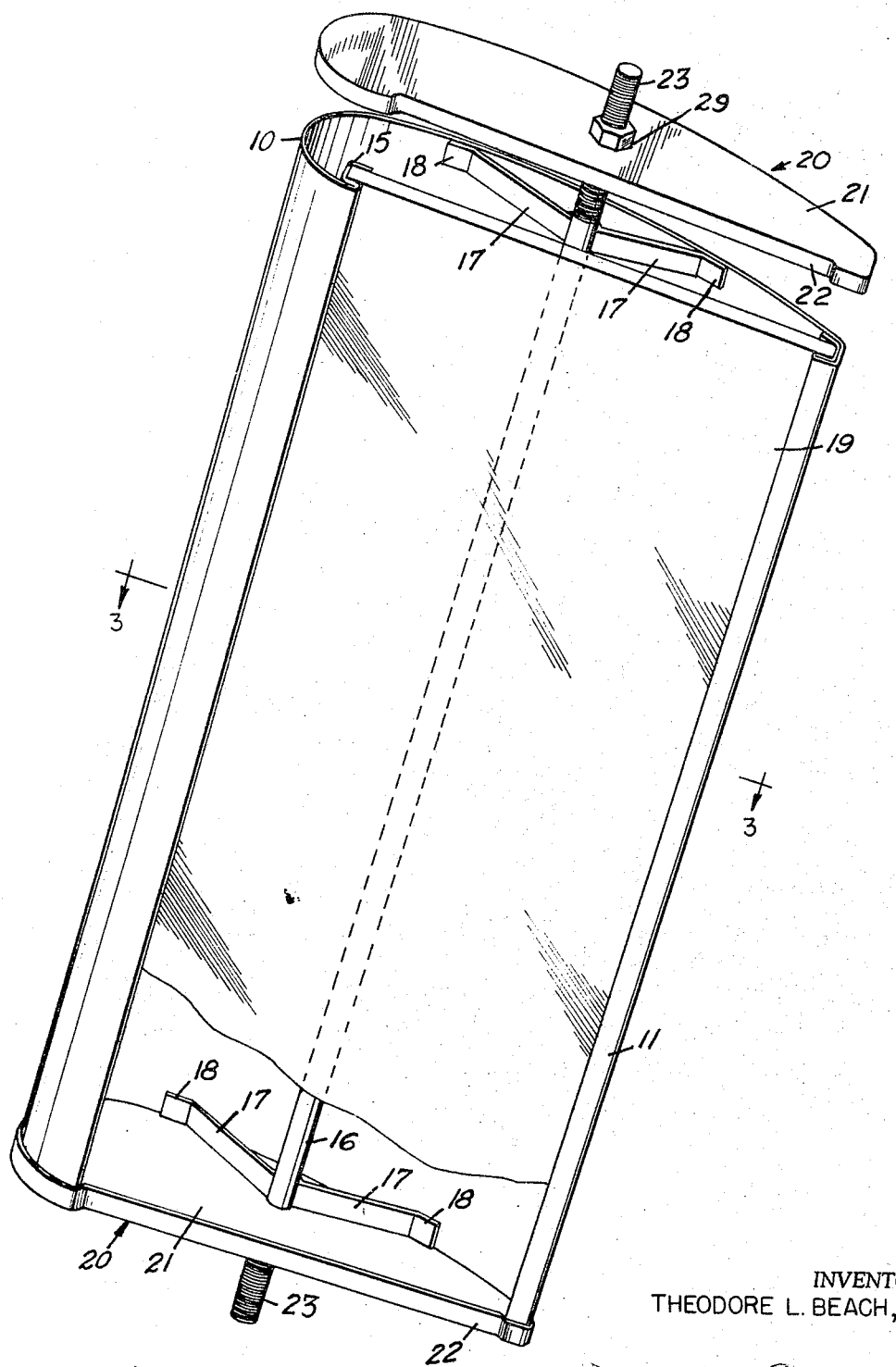
FIGURE 1 is a perspective view, partly broken away, of an embodiment of the invention showing one end thereof partially removed therefrom to disclose details of the invention.
Figure 2:
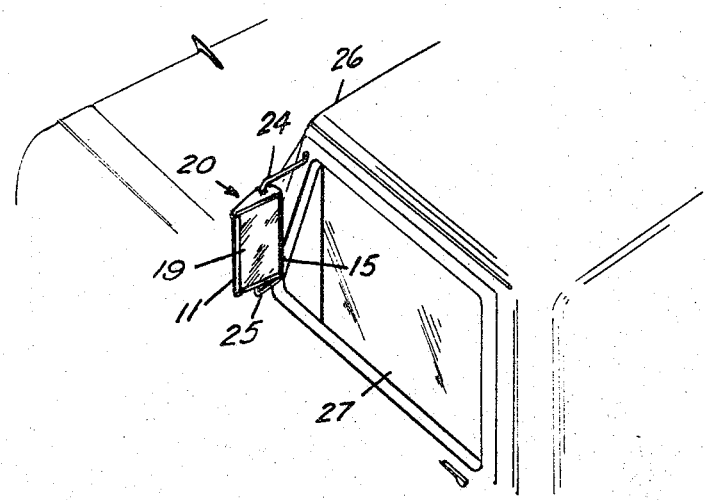
FIGURE 2 is a reduced perspective view illustrating the manner of mounting the device of the present invention upon a vehicle; and, FIGURE 3 is an enlarged sectional view taken substantially along line 3—3 of FIGURE 1.

Referring to the drawings, there is shown therein a mirror structure comprising a housing 10 formed of a single piece of sheet material such as aluminum, stainless steel, plastic or the like and one edge portion is folded upon itself to form a double-walled substantially U-shaped channel 11 and extends thence in substantially a straight line for approximately one-half of the width thereof, as indicated at 12, and thence extends in a slightly curvilinear line, as indicated at 13, to a semi-circular portion 14 which terminates in an integrally formed channel 15.

A shaft 16 extends substantially centrally through the device and has affixed thereto adjacent each end thereof pairs of arms 17 which in each case extend at an obtuse angle relative to each other and each of which is provided at its outer end with an integrally formed foot portion 18 which bears against the inner face of the member 10. A flat mirror 19 has its side edge portions mounted in channels 11 and 15.

Figure 3:
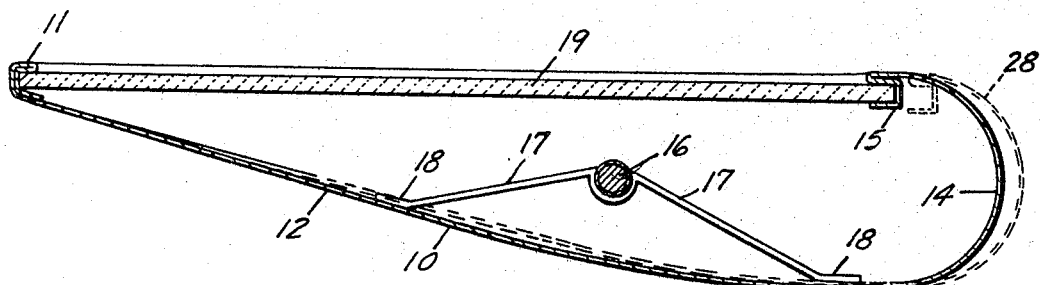

There is also provided a pair of end pieces generally indicated at 20 and each having a flat body portion 21 of substantially the same cross sectional shape and size as the remainder of the device as illustrated in FIGURE 3 when the same is in assembled condition. The end pieces 20 are each provided with inwardly extending integral flanges 22 which are designed to overlie the end portions of the body 10 and the mirror 19.

The end portions of the shaft 16 are exteriorly threaded, as indicated at 23, for mounting the same on upper and lower brackets 24 and 25 for attachment to the body of a truck 26 or other vehicle adjacent the forward part of the driver's side window 27.

Referring again to the casing 10, it will be seen that the same in its expansible, recoilment position will take the dotted line position shown at 28 in FIGURE 3, it being biased to such position when manufactured.

In assembling the mirror of the present invention, the mirror 19 is first placed in the channels 11 and 15, the latter being forced to its position shown in full lines in FIGURE 3, after which the end pieces are brought over the end portions of the mirror 19 and casing 10 to hold the casing 10 against expansion. It will likewise be seen that the inner face of the casing 10 will be brought inwardly during such operation to thus bear against the feet 18 and tension of the arms 17 thus making the device compact, rattle-free and weather resistant. Nuts 29 are provided at either end of the shaft 16 and are then tightened to hold the end pieces 20 in their assembled condition.

While the foregoing presents a preferred embodiment of the present invention, it is obvious that other modifications and/or equivalents may be employed without departing from the scope of the invention, which is defined in the appended claims.

What is claimed is:

1. In a device of the character described, a body of flexible sheet material having an integrally formed U-shaped channel in each side edge thereof, said channels facing each other in coplanar relation, a flat glass mirror mounted in said channels, end pieces encompassing each end portion of said body and mirror, a shaft interconnecting said end pieces, and a pair of divergent arms affixed to said shaft inwardly of each end piece, and a foot member formed integrally with each arm and bearing against the inner wall of said body.

2. In a device of the character described, a body of flexible sheet material having an integrally formed U-shaped channel in each side edge thereof, said channels facing each other in coplanar relation, a flat glass mirror mounted in said channels, end pieces encompassing each end portion of said body and mirror, and means interconnecting said end pieces and including a member bearing against the inner wall of said body, said body being biased prior to assembly to a position wherein its overall width is greater than said end pieces.

3. In a device of the character described, a body of expansible, recoilable sheet material having an integrally formed U-shaped channel in each side edge thereof, said channels facing each other in coplanar relation, a flat glass mirror mounted in said channels, end plieces encompassing each end portion of said body and mirror, a shaft interconnecting said end pieces, and a pair of divergent arms affixed to said shaft inwardly of each end piece, and a foot member formed integrally with each arm and bearing against the inner wall of said body, said body being biased prior to assembly to a position wherein its overall width is greater than said end pieces.

4. In a device of the character described, a body of flexible sheet material having an integrally formed U-shaped channel in each side edge thereof, said channels facing each other in coplanar relation, a flat glass mirror mounted in said channels, end pieces having inwardly extending flanges encompassing each end portion of said body and mirror, a shaft interconnecting said end pieces, a pair of divergent arms affixed to said shaft inwardly of each end piece, and a foot member formed integrally with each arm and bearing against the inner wall of said body, said body being biased prior to assembly to a position wherein its overall width is greater than said end pieces.

5. In a device of the character described, a body of flexible sheet material having an integrally formed U-shaped channel in each side edge thereof, said channels facing each other in coplanar relation, a flat glass mirror mounted in said channels, end pieces having inwardly extending flanges encompassing each end portion of said body and mirror, a shaft interconnecting said end pieces, said body in cross section extending first from one channel in a straight line away from the plane of the channels, then in a slight curve toward the other channel and terminating in a semicircular portion joining said other channel, a pair of divergent arms affixed to said shaft inwardly of each end piece, and a foot member formed integrally with each arm and bearing against the inner wall of said body.

6. In a device of the character described, a body of flexible sheet material having an integrally formed U-shaped channel in each side edge thereof, said channels facing each other in coplanar relation, a flat glass mirror mounted in said channels, end pieces having inwardly extending flanges encompassing each end portion of said body and mirror, and a shaft interconnecting said end pieces, means connected to said shaft and including a member bearing against the inner wall of said body, said body in cross section extending first from one channel in a straight line away from the plane of the channels, then in a slight curve toward the other channel and terminating in a semicircular portion joining said other channel, said body being biased prior to assembly to a position wherein its overall width is greater than said end pieces.

7. In a device of the character described, a body of flexible sheet material having an integrally formed U-shaped channel in each side edge thereof, said channels facing each other in coplanar relation, a flat glass mirror mounted in said channels, end pieces having inwardly extending flanges encompassing each end portion of said body and mirror, a shaft interconnecting said end pieces, said body in cross section extending first from one channel in a straight line away from the plane of the channels, then in a slight curve toward the other channel and terminating in a semicircular portion joining said other channel, a pair of divergent arms affixed to said shaft inwardly of each end piece, and a foot member formed integrally with each arm and bearing against the inner wall of said body, said body being biased prior to assembly to a position wherein its overall width is greater than said end pieces.

References Cited

UNITED STATES PATENTS

| | | | |
|---|---|---|---|
| 2,209,789 | 7/1940 | Mureau | 248—466 |
| 2,579,148 | 12/1951 | Jones | 88—98 XR |
| 2,722,160 | 11/1955 | Prutzman | 88—98 |
| 2,746,354 | 5/1956 | Barkley | 248—276 XR |
| 2,843,018 | 7/1958 | Cooper et al. | 88—97 XR |
| 2,849,920 | 9/1958 | Morgenstern | 88—96 XR |
| 2,851,926 | 9/1958 | Beach | 88—98 |
| 3,059,540 | 10/1962 | Robinson | 88—98 |

FOREIGN PATENTS 660,898   4/1963   Canada.

JOHN PETO, *Primary Examiner.*

JEWELL H. PEDERSEN, *Examiner.*

J. M. GUNTHER, *Assistant Examiner.*